United States Patent [19]

Kirchweger et al.

[11] Patent Number: 4,459,944
[45] Date of Patent: Jul. 17, 1984

[54] WATER-COOLED INTERNAL COMBUSTION ENGINE WITH A SOUND-ABSORBING COVER

[75] Inventors: Karl Kirchweger; Franz Knopf; Gerhard Thien, all of Graz, Austria

[73] Assignee: Hans List, Graz, Austria

[21] Appl. No.: 397,204

[22] Filed: Jul. 12, 1982

[30] Foreign Application Priority Data

Jul. 15, 1981 [AT] Austria .................................. 3133/81

[51] Int. Cl.³ .......................... F01P 1/02; F02B 77/00
[52] U.S. Cl. .................................. 123/41.66; 123/41.7; 123/198 E; 123/195 C
[58] Field of Search .............. 123/195 C, 198 E, 41.7; 181/204, 41.66

[56] References Cited

U.S. PATENT DOCUMENTS

| | | | |
|---|---|---|---|
| 1,296,443 | 3/1919 | Turner | 123/41.66 |
| 1,761,929 | 6/1930 | McCuen | 123/41.66 |
| 3,949,726 | 4/1976 | List | 123/198 E |
| 3,951,114 | 4/1976 | Fachbach et al. | 123/198 E |
| 3,964,462 | 6/1976 | Thien et al. | 123/198 E |
| 4,071,009 | 1/1978 | Kraina | 123/198 E |
| 4,126,115 | 11/1978 | List et al. | 123/198 E |
| 4,188,924 | 2/1980 | Kirchweger et al. | 123/198 E |
| 4,203,407 | 5/1980 | Fachbach et al. | 123/198 E |
| 4,226,217 | 10/1980 | Haslbeck et al. | 123/198 E |

FOREIGN PATENT DOCUMENTS 2835032  2/1979  Fed. Rep. of Germany .
  97921  5/1973  German Democratic Rep. .

Primary Examiner—Ira S. Lazarus
Attorney, Agent, or Firm—Watson, Cole, Grindle & Watson

[57] ABSTRACT

In order to improve in a simple manner the ventilation of a water-cooled internal combustion engine having a sound-absorbing cover, a suction device is provided at the air inlet opening of the cover, the suction device containing a suction port in the low pressure area of the radiator/fan assembly. By specific placement of several air inlet openings a variety of cooling requirements may be met.

10 Claims, 7 Drawing Figures

WATER-COOLED INTERNAL COMBUSTION ENGINE WITH A SOUND-ABSORBING COVER

BACKGROUND OF THE INVENTION

The present invention relates to a water-cooled internal combustion engine comprising a sound-absorbing cover and a radiator/fan assembly located outside of the cover, the fan drawing in cooling air through the radiator during operation of the internal combustion engine, and the cover being provided with at least one sound-insulating air inlet opeing and at least one sound-insulating air outlet opening, these openings enabling the supply of cooling air for ventilating the space enclosed by the cover.

DESCRIPTION OF THE PRIOR ART

In an internal combustion engine of the above type which is known from German laid-open print 28 35, e.g., a fan wheel is attached to a V-belt pulley at the front end of the combustion engine inside of the sound-absorbing cover, this fan wheel conveying cooling air into the interior of the cover via a sound-insulated air inlet opening. For venting the cover interior, sound-insulating air outlet openings are provided in a separate exhaust jacket which is supplied with cooling air from the engine cover, one air outlet opening being located at the upper lid of the cover and one being located where the output shaft passes through the sound absorbing cover. However, this known type of design suffers from the disadvantage that a large amount of construction space is used up at the front end of the encapsultaed engine. Due to lack of space, a fan wheel is usually mounted only at the front of one of the pulleys present in the engine. In most cases, these places are the front-most points of the internal combustion engine, thus increasing the length of the engine to a considerable extent. In addition, an air duct will be necessary for introducing air from the side, from below or from above, since the air should only be taken to the cover from outside the flow of heated air from the radiator, in order to avoid being warmed up prematurely. This air duct will have to be wider than the fan itself in order to permit an adequate stream of air into the fan, which again will result in a marked increase in length of the internal combustion engine.

This is considered a grave disadvantage, as there usually is very little extra space in the longitudinal direction, e.g., when such a combustion engine is used for powering a truck, since the aim is to have as large a cargo area as possible within the constraints on vehicle length imposed by law.

Moreover, this known type of design will seriously impede replacement of the V-belts for driving the water-pump, generator, etc.

SUMMARY OF THE INVENTION

It is an object of the present invention to avoid the above disadvantages of the known types of internal combustion engines enclosed by a sound-absorbing cover, and to improve above all the design of the ventilating system for the space enclosed by the cover, in view of the usual space constraints such an engine must cope with.

According to the invention this is achieved by providing a suction device for the air outlet opening, or for each of the air outlet openings, respectively, which is used for creating a partial vacuum inside the cover and for drawing off the cooling air sucked in through the air inlet opening(s) and heated inside the cover, via the air outlet opening, and by providing the suction device with a suction port located in the low pressure area of the radiator/fan assembly, which is connected to the air outlet opening in the cover. This presents a variety of options for placing the air outlet opening(s) into the cover, which will ease some of the mounting constraints, since the air outlet opening(s) or rather the suction device(s) may freely blow off the cooling air drawn from the cover without any further restriction. In addition, this will ensure in a simple manner a sufficient flow of air between inlet and outlet, for ventilating the cover without the use of a separate blower.

In an enhanced version of the present invention an internal combustion engine whose sound-absorbing cover also encloses a gearbox attached to the engine, is provided with an air inlet opening on the side of the cover next to the gearbox—preferably where the output shaft penetrates the cover. In the known types of combustion engine mentioned above, the separate fan blowing freely inside the cover will ensure an excellent cooling of the engine cover itself or of the exterior surfaces of the engine; since the combustion engine has its own water or air cooling system, however, and quite often a separate oil cooler, the design effort for this type of cooling/ventilation system seems to be somewhat excessive, above all in view of the additional possibility of replacing temperature-sensitive components or materials by more resistant ones or of positioning such components outside of the sound-absorbing cover. This applies, e.g., to the temperature-sensitive rectifier diode of three-phase generators. On the other hand, the known design variant does not provide for adequate cooling of a gearbox which is flange-mounted to the rear end of the internal combustion engine, which in combustion engines without any sound-absorbing cover is usually cooled by headwind only–an effect which is of course prevented by the cover. After having passed the exterior surfaces of the engine, the cooling air in the cover of the known variant will arrive at the gearbox at a temperature of 80° C. approximately, which will greatly reduce its cooling effect. This may cause temperature rises of the gearbox oil which cannot be tolerated.

Positioning an air inlet opening at the gearbox end of the cover according to the present invention, will ensure—together with the suction device—that the gearbox which (unlike the combustion engine itself) has no cooling system of its own normally, is sufficiently cooled by the fresh air entering the cover, even in extreme operating conditions, thus achieving a more homogeneous cooling effect inside the cover. The cooling air which has already been heated by passing the gearbox will still suffice for cooling and ventilating the enclosed space in the engine area, since the engine itself has a built-in cooling system of its own.

According to a further enhancement of the invention it will be of particular advantage to arrange the suction port in an air duct between the radiator and the fan, and to connect it with the air outlet opening in the cover by means of a suction pipe. In this way the partial vacuum which is particularly pronounced in the area between the radiator and the fan is directly used for ventilating the sound-absorbing cover at the same time, which—due to the small amount of air required for ventilating the cover—will necessitate no appreciably increase in the air throughput of the radiator/fan assembly.

If the internal combustion engine is used for powering a motor vehicle whose longitudinal frame spars are an integral part of the engine cover, a further variant of the present invention provides that at least part of the suction pipe consists of closed parts of the spars. Thus the off-air passage of the radiator/fan assembly need not be obstructed by any additional parts; it will suffice to mount additional connecting pieces in the area of the radiator/fan housing in front of the fan and at the opening into the cover.

If the radiator/fan assembly of the internal combustion engine is directly driven by the engine and is situated next to a cover wall, another enhanced variant of the invention proposes that an air outlet opening be located at the entrance of the driving shaft of the radiator/fan assembly into the cover, and that it should serve as a suction port at the same time. Due to the location of the radiator/fan assembly in the vicinity of a cover wall, the air will pass through it in a semi-radial direction, resulting in a low-pressure zone in the hub area between the radiator/fan assembly and the cover wall, which may be utilized to advantage for the purposes of the present invention.

In another improved variant of the invention the suction device comprises a separate fan, preferably driven by the internal combustion engine directly. This will ensure a sufficient flow of air for cooling the cover interior independently of any other auxiliary devices of the internal combustion engine.

Another enhanced version of the invention which is particularly advantageous, suggests that additional air inlet openings be made in the cover in the vicinity of those parts of the engine which need special cooling. This method of individually cooling specific places inside of the sound-absorbing cover which are particularly sensitive or under high thermal loads, is based on the principle that the cooling air for the enclosed space is drawn off from the interior of the cover via the outlet opening(s) upon which—due to the effect of the partial vacuum in the interior—fresh air will flow in at the inlet opening(s), rather than being fed into the cover via an inlet openings and flowing out again due to the effect of the excess pressure in the interior—as would be typical of internal combustion engines of the known type mentioned at the beginning of this paper. In this context, the use of guide-vanes at the additional air inlet openings is suggested in another variant of the invention, for directing the flow of cooling air that has been drawn in, in order to achieve an even better cooling of specific areas.

According to yet another variant of the invention, in which a generator is situated inside the cover at the side of the combustion engine opposite of the gearbox and has a cooling fan of its own, the suction side of the generator fan may be connected with a separate air inlet opening in the cover by means of sound-absorbing elements, which will permit any parts of the engine in the vicinity of the generator—which is rather remote from the gearbox already—to be supplied with fresh cooling air, as the cooling air in the cover which has entered at the gearbox end, will already be rather warm when reaching this remote area.

The air drawn in by the generator fan will only be moderately heated by the generator itself, and may therefore reduce the temperature of the cover interior to a considerable extent in this particular area.

DESCRIPTION OF THE DRAWINGS

Following is a more detailed description of preferred embodiments of the present invention, as illustrated by the enclosed drawings, wherein.

DESCRIPTION OF THE PREFERRED EMBODIMENTS

Figure 1:
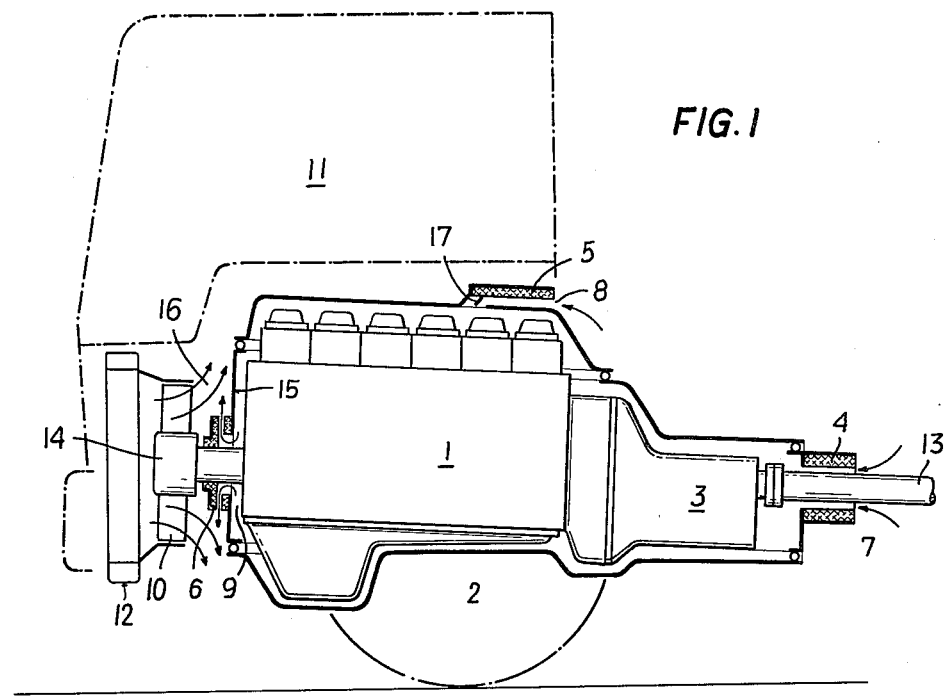
FIG. 1 shows an internal combustion engine as described by the present invention, for powering a motor truck.

According to FIG. 1 an internal combustion engine 1 is provided with a sound-absorbing cover 2 which also encloses a gearbox 3 flange-mounted on the combustion engine 1, and which contains air inlet and outlet openings 7, 8, 9 made sound-proof by means of absorption mufflers 4, 5, 6. Outside of the cover 2 a fan 10 is provided which is directly driven by the combustion engine 1 and which draws in cooling air through a radiator 12 located at the front end of a motor vehicle 11 powered by the combustion engine 1, the radiator 12 being connected to the water-cooling system of the combustion engine 1 in a manner not shown.

In order to avoid thermal overloads, the space enclosed by the sound-absorbing cover 2 must be cooled and ventilated. For this purpose fresh air is used which enters the cover 2 through the air inlet opening 7 situated where the output shaft 13 of the gearbox 3 penetrates the cover 2, and through the additional air inlet opening 8 at the top of the sound-absorbing cover 2, and which leaves the cover 2 through the outlet opening 9—which in this variant is an annular gap around the fan shaft—and its adjoining absorption muffler 6. The forced ventilation necessary for efficient cooling of the space enclosed by the cover 2, is ensured by placing the air outlet opening 9, or rather the mouth of the adjoining absorption muffler 6, in the low pressure area behind the hub 14 of the fan 10, through which the air sucked in via the radiator 12 flows in a semi-radial direction as indicated by arrows 16, because of its being situated next to the front cover wall 15. Due to this particular location of the air outlet opening 9 a suction device will be formed which is used for creating a partial vacuum in the interior of the cover 2, drawing off the cooling air from the cover by way of the air outlet opening 9, after it has been heated inside the cover.

The air entering the cover 2 at its gearbox end, mainly via the air inlet opening 7, because of the partial vacuum prevailing inside the cover 2 during operation of the internal combustion engine 1, will cool the gearbox first of all, where it will successfully prevent overheating of this area, which has always been a critical point in conventional types of sound-proof internal combustion engines with the gearbox mounted inside the cover. On account of the partial vacuum inside the cover 2, cooling air will also flow in through the additional air inlet opening 8, from where it may be directed towards critical surface areas of the internal combustion engine via a guide-vane 17. Further air inlet openings may be added in other sections of the cover 2, which will permit efficient cooling of any areas of the internal combustion engine under high thermal loads.

The internal combustion engine 1 represented in FIG. 2 again is built into a motor vehicle 11 which it powers, and differs from the one shown in FIG. 1 only in that it employs a different kind of suction device for drawing off the cooling air from the sound-absorbing cover 2. In this variant a suction port 18 is positioned in the radiator fan housing 19 between the radiator 12 and the fan 10, which is connected with the air outlet opening 9' via a suction pipe 20. Thus, the cooling air—which again enters the cover 2 mainly at its rear end by way of an absorption muffler 4 (along arrows 21), where the gear output shaft 13 penetrates the cover 2,—is sucked through the interior of the sound-absorbing cover 2 by the vacuum prevailing between the radiator 12 and the fan 10, thereby efficiently cooling the gearbox which has no cooling system of its own. As is shown in FIG. 1, parts of the internal combustion engine 1 and other units inside the cover 2 requiring additional cooling may be directly cooled by fresh air from outside entering the cover via additional air inlet openings (not shown in this drawing).

Figure 2:
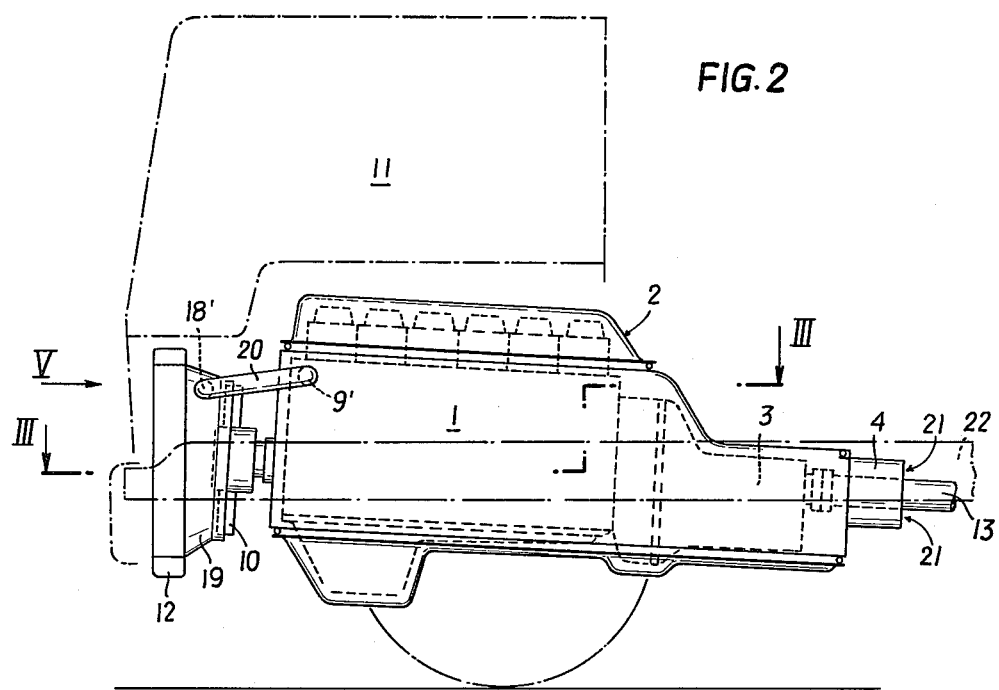
FIG. 2 shows a variant of the internal combustion engine illustrated in FIG. 1.
Figure 3:
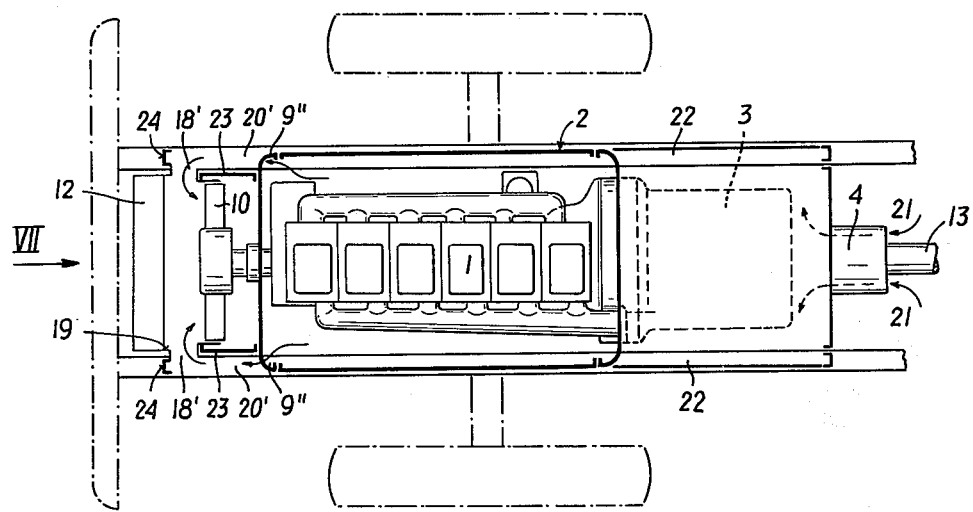
FIG. 3 shows another embodiment of the invention, in a partial section corresponding to line III—III in FIG. 2.

FIG. 3 shows a design variant of FIG. 2. The longitudinal spars 22 of the vehicle frame which are an integral part of the cover 2 of the internal combustion 1, and which normally have an open C-profile normally, are provided with covers 23 in the area between the suction ports 18' in the radiator/fan housing 19 between the radiator 12 and the fan 10, thus forming a closed suction pipe 20' in the section between the air outlet openings 9" at the sound-aborbing cover 2 and the suction ports 18', which is complemented by additional parts 24.

Figure 4:
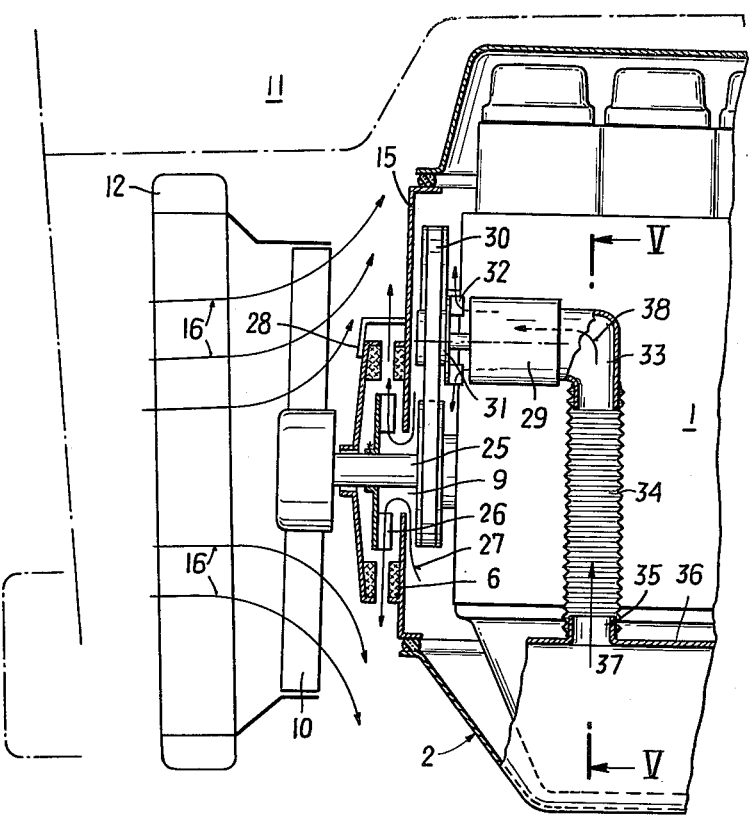
FIG. 4 is a partial section through another variant of the invention.

In the variant shown in FIG. 4, the drive shaft 25 for the fan 10 located outside of the sound-absorbing cover 2 bears a separate blower 26, which will suck off the cooling air entering the sound-absorbing cover 2 in a manner not shown, by way of the air outlet opening 9 in the direction of arrows 27, which opening again is placed at the penetration point of the drive shaft 25 for the fan 10, in analogy to the variant in FIG. 1. Finally, before entering the open, the cooling air will pass an absorption muffler 6, whose outer part is attached to the front cover wall 15 by means of braces 28.

Due to the location of the fan 10 in the immediate vicinity of the front cover wall 15, the flow of cooling air through the radiator 12 along arrows 16 again will be essentially semi-radial, and a partial vacuum will be established in the area around the outlet gap of the absorption muffler 6, which will greatly enhance the effect of the blower 26.

Figure 5:
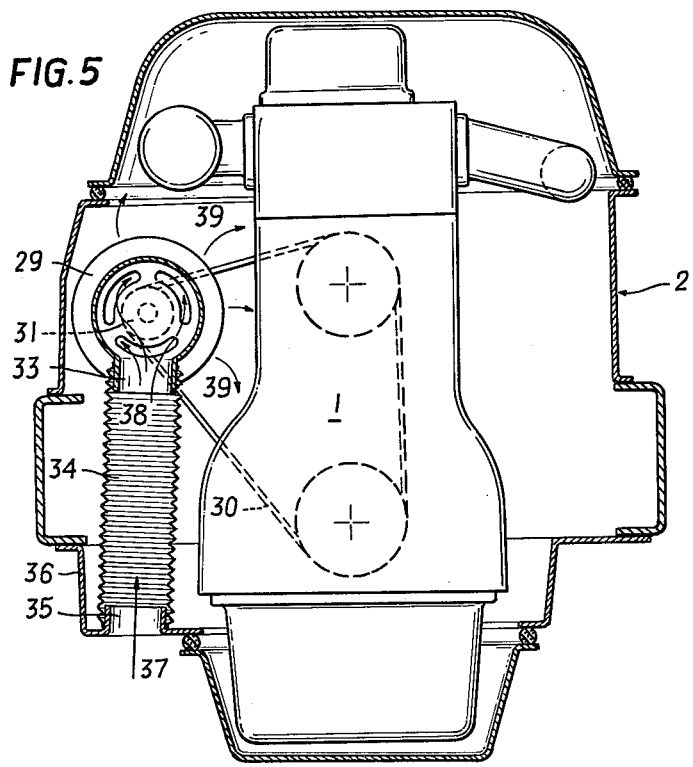
FIG. 5 is a partial section along line V—V in FIG. 4.

Also shown in FIG. 4 is the additional possibility of improving the cooling system of the cover by utilizing a generator 29 which is mounted inside the cover. The generator 29 which is directly driven by the internal combustion engine 1 by means of a V-belt, has a fan wheel 32 coupled to its drive wheel 31, which is normally used only for inside cooling of the generator itself. According to the depicted embodiment of the present invention, the side of the generator 29 opposite of the drive wheel 31 carries a socket 33 to which a flexible hose 34 is attached, which in turn is attached to a connecting piece 35 at the bottom part 36 of the cover. This design will enable fresh cooling air to be drawn in via the generator 29 from outside of the cover 2 in the direction of arrows 37, 38, and to be subsequently distributed by the fan wheel 32 in the front part of the sound-absorbing cover 2 along arrows 39 in FIG. 5.

Figures 6, 7:
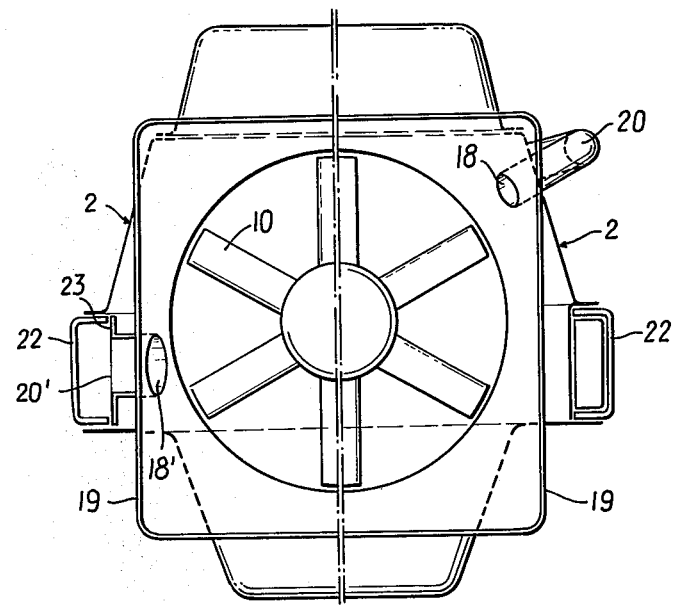
FIG. 6 is a view of the internal combustion engine illustrated in FIG. 2, along arrow VI, with the radiator removed.
FIG. 7 is a view corresponding to FIG. 6, along arrow VII in FIG. 3.

FIG. 6 offers a view into the radiator fan housing 19 according to FIG. 2, after removal of the radiator. Shown are the suction port 18 in the radiator/fan housing 19 and its corresponding suction pipe 20 leading into the air outlet opening (not shown here) in the sound-absorbing cover 2. Again, the longitudinal spars 22 of the vehicle frame are part of the wall of the sound-absorbing cover 2, but in this case they are not used as air ducts.

The view of the design variant according to FIG. 3 which is represented in FIG. 7, indicates the position of the suction port 18' in the radiator/fan housing 19, when part of the longitudinal spars 22 of the vehicle frame are used as a suction pipe 20'. This drawing also shows the covers 23 of the otherwise open C-profile spars.

All described design variants are based on the principle of sucking in cooling air for the cover of the internal combustion engine by utilizing a partial vacuum inside the cover, which is established by placing a suction port in the low pressure area of the radiator/fan assembly, permitting a variety of cooling possibilities for individual sections of the space enclosed by the cover and of the surface of the internal combustion engine, as well as of any other parts enclosed by the cover, e.g., as discussed under FIG. 1.

We claim:

1. A water-cooled internal combustion engine comprising a sound-absorbing cover and a radiator/fan assembly located outside of said cover, said fan drawing in cooling air through said radiator during operation of said internal combustion engine, and said cover being provided with at least one sound-insulating air inlet and outlet opening each for the supply of cooling air for ventilating the space enclosed by said cover, wherein a suction device is provided for each of said air outlet openings for creating a partial vacuum inside said cover and for drawing off the cooling air sucked in through said air inlet openings and heated inside said cover via said air outlet openings, and wherein said suction device is provided with a suction port located in the low pressure area of said radiator/fan assembly, said port being connected to said air outlet opening in said cover.

2. An internal combustion engine as in claim 1, wherein said cover also encloses a gearbox attached to said engine, and one of said air inlet openings is provided on the side of said cover next to said gearbox.

3. An internal combustion engine according to claim 2, wherein said gearbox-side inlet opening is provided where the output shaft of said gearbox penetrates said cover.

4. An internal combustion engine as in claim 1, wherein said suction port is provided in an air duct between said radiator and said fan, and is connected with said air outlet opening in said cover by means of a suction pipe.

5. An internal combustion engine as in claim 4, for powering a motor vehicle whose longitudinal frame spars are an integral part of said engine cover wherein at least part of said suction pipe is formed of closed part of said longitudinal spars.

6. An internal combustion engine as in claims 1 or 2, wherein said radiator/fan assembly is directly driven by said engine and is situated next to a wall of said engine cover, and at least one of said air outlet openings is directly located at the entrance of a driving shaft of said radiator/fan assembly into said cover, and will serve as a suction port at the same time.

7. An internal combustion engine as in claims 1 or 2, wherein said suction device comprises a separate fan, which is driven by said internal combustion engine directly.

8. An internal combustion engine as in claim 1, wherein separate air inlet openings are placed in said cover in the vicinity of those parts of said combustion engine which need special cooling.

9. An internal combustion engine as in claim 8, wherein said air inlet openings are provided with guide-vanes for directing the drawn-in flow of cooling air.

10. An internal combustion engine as in claim 2, comprising a generator situated inside said cover at the side of said engine opposite of said gearbox, said generator having a cooling fan of its own, wherein the suction side of said fan of said generator is connected with a separate air inlet opening in said cover.

* * * * *